(12) United States Patent
Kim

(10) Patent No.: US 8,642,207 B2
(45) Date of Patent: Feb. 4, 2014

(54) CYLINDRICAL SECONDARY BATTERY

(75) Inventor: Daekyu Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 191 days.

(21) Appl. No.: 13/137,049

(22) Filed: Jul. 18, 2011

(65) Prior Publication Data

US 2012/0070707 A1    Mar. 22, 2012

(30) Foreign Application Priority Data

Sep. 16, 2010    (KR) .................. 10-2010-0090919

(51) Int. Cl.
*H01M 2/08*    (2006.01)

(52) U.S. Cl.
USPC .......................................... 429/172; 429/174

(58) Field of Classification Search
USPC .................. 429/171, 172, 173, 174
See application file for complete search history.

(56) References Cited

U.S. PATENT DOCUMENTS

| | | | |
|---|---|---|---|
| 6,224,640 B1 * | 5/2001 | Tucholski .................. | 429/172 X |
| 7,442,467 B2 * | 10/2008 | Ebi et al. ...................... | 429/174 |
| 7,618,745 B2 * | 11/2009 | Yamashita et al. ........ | 429/174 X |
| 8,017,266 B2 * | 9/2011 | Matsuhisa et al. ............ | 429/174 |
| 8,097,358 B2 * | 1/2012 | Lee ............................ | 429/174 X |
| 2007/0154781 A1 | 7/2007 | Choi | |
| 2009/0233160 A1 | 9/2009 | Kim | |

FOREIGN PATENT DOCUMENTS

| | | |
|---|---|---|
| KR | 10-2007-0071235 A | 7/2007 |
| KR | 10-0917742 B1 | 9/2009 |

OTHER PUBLICATIONS

Korean Notice of Allowance dated Jul. 29, 2012.

* cited by examiner

*Primary Examiner* — Stephen J. Kalafut
(74) *Attorney, Agent, or Firm* — Lee & Morse, P.C.

(57) ABSTRACT

A secondary battery includes an electrode assembly formed by winding two different electrodes and a separator interposed therebetween, a can housing the electrode assembly, a cap assembly at a upper opening of the can; and a gasket interposed between the cap assembly and the can. The gasket has a relaxed condition prior to compression between the cap assembly and an upper portion of the can and a compressed condition after compression between the cap assembly and the upper portion of the can. The gasket includes a sidewall portion bent inwardly from outside of the can when the gasket is in the compressed condition, a bottom portion at a bottom of the sidewall portion and extending inwardly from a periphery of the can, a protruding portion on which the cap assembly is seated, and a concave portion formed between the protruding portion and an inner surface of the sidewall portion.

14 Claims, 4 Drawing Sheets

CYLINDRICAL SECONDARY BATTERY

BACKGROUND

1. Field

Embodiments relate to a secondary battery.

2. Description of the Related Art

Generally, secondary batteries are classified into cylindrical, prismatic and pouch type batteries according to the shape of a case receiving an electrode assembly. Specifically, the cylindrical secondary battery includes a cylindrical electrode assembly inserted into a cylindrical can, and a cap assembly to seal an upper opening of the cylindrical can. The cap assembly is electrically connected to the electrode assembly to allow current generated in the electrode assembly to flow to the outside.

SUMMARY

According to an embodiment, there is provided a secondary battery including an electrode assembly formed by stacking two different electrodes and a separator interposed therebetween and winding the same, a can to house the electrode assembly, a cap assembly at a upper opening of the can, and a gasket interposed between the cap assembly and the can. The gasket has a relaxed condition prior to compression between the cap assembly and an upper portion of the can and a compressed condition after compression between the cap assembly and the upper portion of the can. The gasket includes a sidewall portion bent inwardly from outside of the can when the gasket is in the compressed condition, a bottom portion at a bottom of the sidewall portion and extending inwardly from a periphery of the can, a protruding portion on which the cap assembly is seated, and a concave portion formed between the protruding portion and an inner surface of the sidewall portion.

When the gasket is in the relaxed condition, the protruding portion may protrude from the bottom portion in a direction away from a lower plate of the can, and form a tilt angle with respect to a direction parallel with the lower plate of the can.

The tilt angle may be in a range from 25° to 75°.

A top of the protruding portion may include a planar portion.

The planar portion may have a length in a radial direction in a range from 0.1 mm to 0.25 mm.

The cap assembly may include a cap up, a safety vent, and a cap down.

A positive temperature coefficient (PTC) element as a secondary protective device may be further provided between the cap up and the safety vent.

When the gasket is in the relaxed condition, a distance between the inner surface of the sidewall portion and the innermost part of the protruding portion may be in a range from 0.42 mm to 0.98 mm.

When the gasket is in the relaxed condition, the protruding portion may have a height in a range from 0.3 mm to 0.6 mm.

A reinforcement member may be further provided between the inner surface of the sidewall portion and the protruding portion.

The reinforcement member may contact the inner surface of the sidewall portion and the bottom surface of the concave portion.

The reinforcement member may have a top portion having a planar shape.

When the gasket is in the relaxed position, a height of the reinforcement member may be in a range of ⅓ to ⅔ of a height of the protruding portion.

The gasket may be made of at least one of polypropylene, polyethylene, and polyethylene terephthalate.

The can that houses the electrical assembly may be cylindrical.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
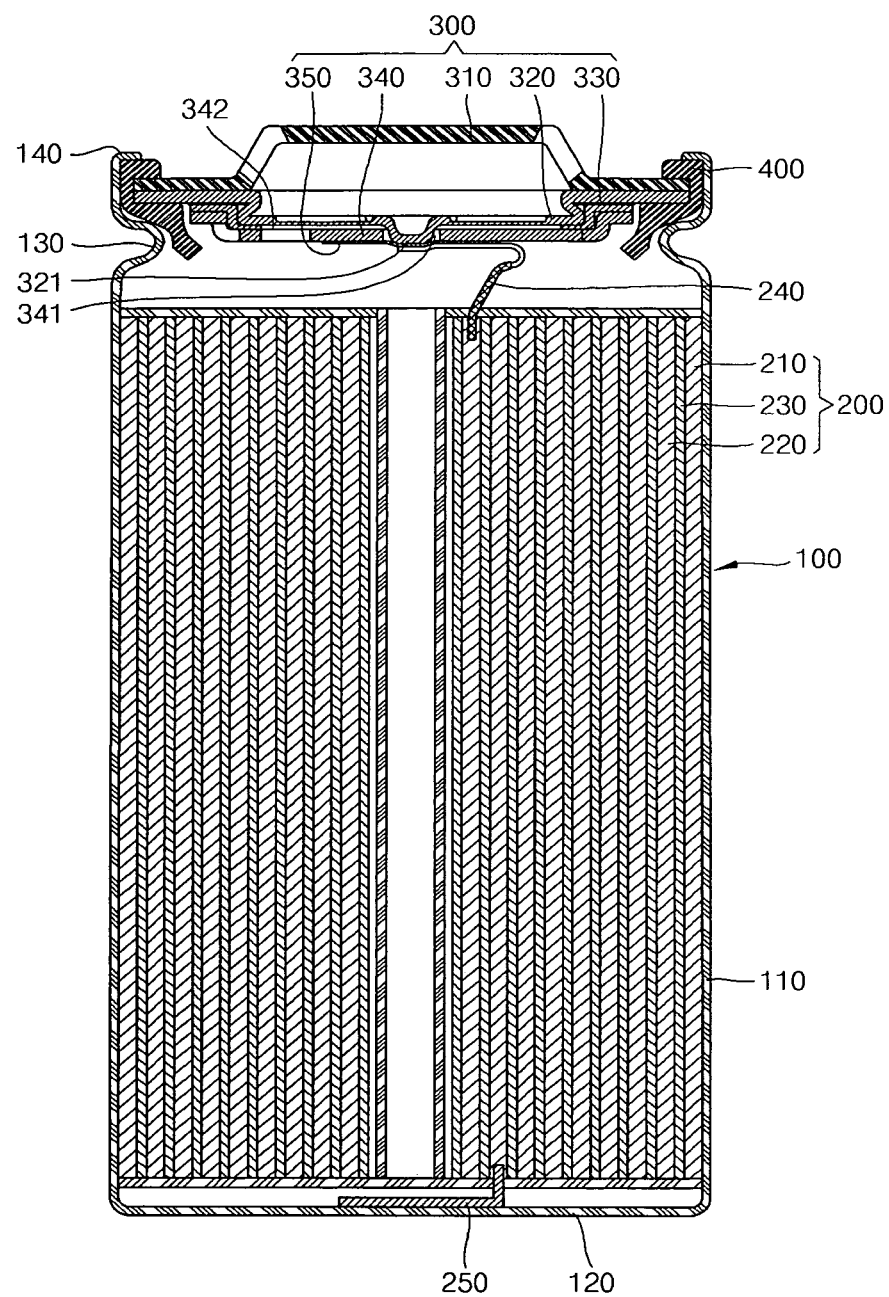
FIG. 1 illustrates a frontal section view of a secondary battery according to an embodiment.

Korean Patent Application No. 10-2010-0090919, filed on Sep. 16, 2010 in the Korean Intellectual Property Office, and entitled: "Cylindrical Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

First, a secondary battery according to an embodiment will be described.

Figure 2:
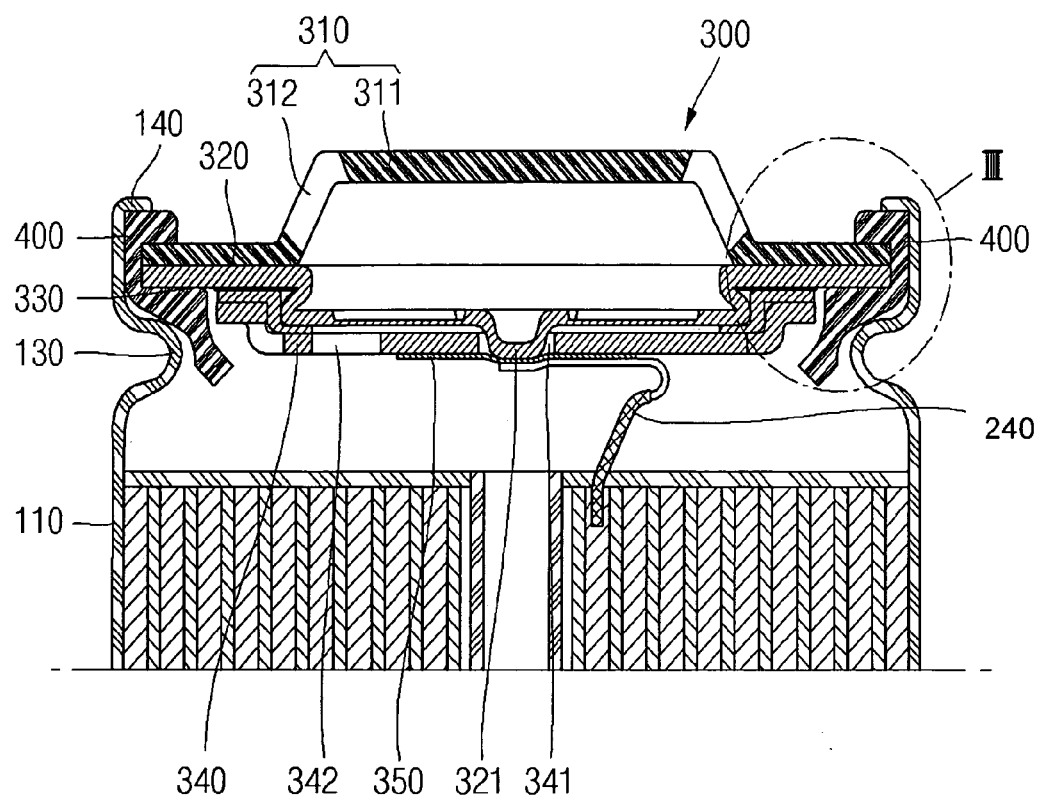
FIG. 2 illustrates an enlarged frontal section view of a cap assembly of the secondary battery shown in FIG. 1.
Figure 3A:
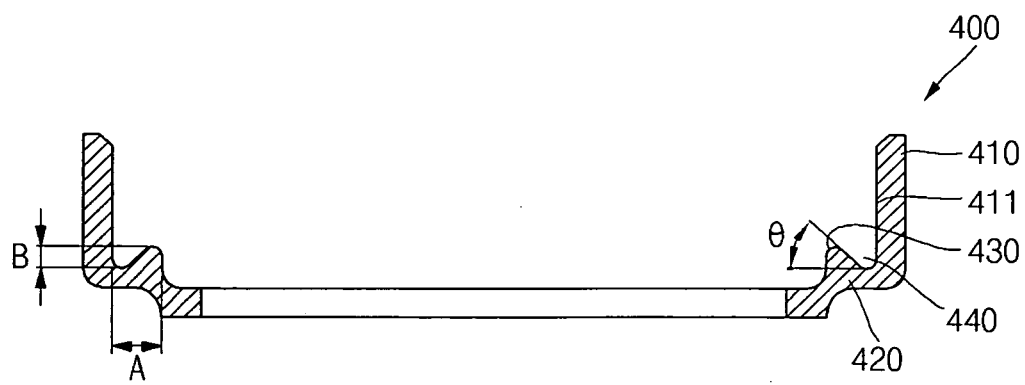
FIG. 3A illustrates a frontal section view of a gasket of the secondary battery shown in FIG. 1.
Figure 3B:
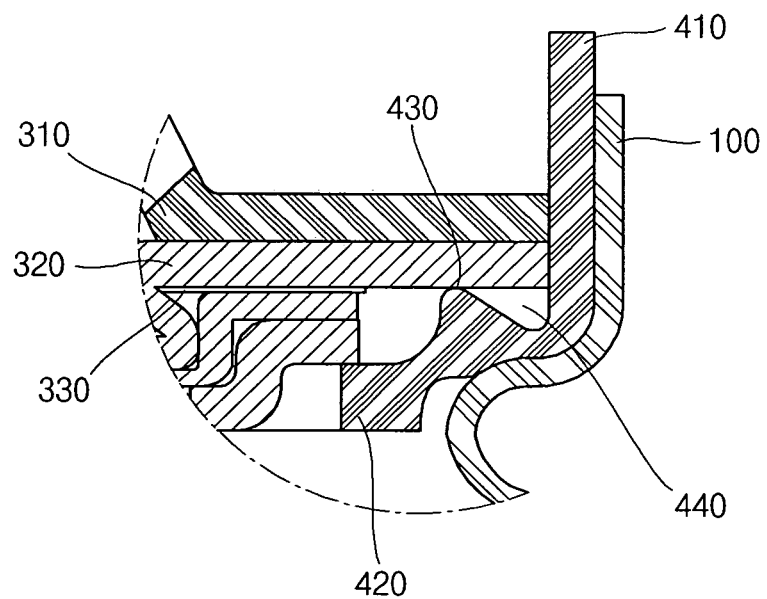
FIG. 3B illustrates a frontal section view of a portion III of the cap assembly illustrated in FIG. 2 in a state in which the cap assembly is yet to be crimped.

FIG. 1 is a frontal section view of a secondary battery according to an embodiment, FIG. 2 is an enlarged frontal section view of a cap assembly of the secondary battery shown in FIG. 1, FIG. 3A is a frontal section view of a gasket of the secondary battery shown in FIG. 1, and FIG. 3B is a frontal section view of a portion III of the cap assembly illustrated in FIG. 2 in a state in which the cap assembly is yet to be crimped.

Referring to FIGS. 1 and 2, the secondary battery according to an embodiment includes a can 100, an electrode assembly 200 inserted into the can 100, a cap assembly 300 coupled to a upper opening of the can 100, and a gasket 400 installed between the cap assembly 300 and an inner circumferential surface of the upper opening of the can 100.

The can 100 includes a cylindrical side plate 110 having a predetermined diameter to form a space to receive the electrode assembly 200, and a lower plate 120 sealing a bottom portion of the side plate 110. In addition, a beading part 130 for preventing the electrode assembly 200 from moving is formed at an upper opening of the can 100. A crimping part 140 for fixing the cap assembly 300 is formed at the uppermost part of the cylindrical can 100.

The can 100 may be made of a lightweight conductive metal such as aluminum or an aluminum alloy. In addition, the can 100 may be formed by, for example, a deep drawing process.

The electrode assembly 200 may be formed by winding into a jellyroll-type shape a positive electrode plate 210 including a positive electrode active material coated on a surface of a positive electrode collector, a negative electrode plate 220 including a negative electrode active material coated on a surface of a negative electrode collector, and a separator 230 interposed between the positive and negative electrode plates 210 and 220 and electrically connecting the positive and negative electrode plates 210 and 220 to each other.

At an upper portion of the electrode assembly 200, a positive electrode tab 240 is connected to the cap assembly 300, and at a lower portion of the electrode assembly 200, a negative electrode tab 250 is connected to the lower plate of the can 100.

The positive electrode collector of the positive electrode plate 210 is made of a conductive metal to collect electrons from a positive electrode coating portion to permit the collected electrons to move to an external circuit. The positive electrode coating portion may be prepared by mixing a positive electrode active material, a conductive agent, and a binder, and coating the resultant mixture on the positive electrode collector to a predetermined thickness. A positive electrode uncoated portion may be formed at both ends of the positive electrode plate 210, where the positive electrode active material is not coated, and the positive electrode tab 240 is welded to one side of the positive electrode uncoated portion.

The negative electrode collector of the negative electrode plate 220 is made of a conductive metal to collect electrons from a negative electrode coating portion to permit the collected electrons to move to an external circuit. The negative electrode coating portion may be prepared by mixing a negative electrode active material, a conductive agent, and a binder, and coating the resultant mixture on the negative electrode collector to a predetermined thickness. A negative electrode uncoated portion may be formed at both ends of the negative electrode plate 220, where the negative electrode active material is not coated, and the negative electrode tab 250 is welded to one side of the negative electrode uncoated portion.

The separator 230 is interposed between the positive electrode plate 210 and the negative electrode plate 220 and may extend to surround the outer circumferential surface of the electrode assembly 200. The separator 230 prevents a short between the positive electrode plate 210 and the negative electrode plate 220. The separator 230 may be made of a porous polymer material to permit lithium ions to pass therethrough.

The cap assembly 300 is electrically connected to the electrode assembly 200, and includes an upper cap portion, referred to herein as a "cap up" 310, a safety vent 320, a lower cap portion, referred to herein as a "cap down" 340, an insulator 330, and a sub plate 350. The cap up 310 transfers the current generated from the electrode assembly 200 to the outside. The safety vent 320 contacts a lower surface of the cap up 310. The safety vent 320 interrupts current and discharges internal gas when abnormal internal pressure is generated in the cylindrical can 100. The cap down 340 is provided below the safety vent 320 to seal the cylindrical can 100. The insulator 330 is interposed between the safety vent 320 and cap down 340. The sub plate 350 is fixed to a lower surface of the cap down 340, and the positive electrode tab 240 (cathode tab) is attached to the sub plate 350.

The cap up 310 is formed of a circular plate having a terminal part 311 that convexly projects from the center thereof and is electrically connected to an external device. A plurality of gas discharge holes 312 are formed on the outer circumferential surface of the terminal part 311 to discharge the gas generated inside the can 100.

The safety vent 320 is formed of a circular plate corresponding to that of the cap up 310, and a protruding portion 321 protrudes downwardly in the center of the safety vent 320.

The insulator 330 is interposed between the safety vent 320 and the cap down 340 and is made of a material capable of insulating the safety vent 320 and the cap down 340 from each other.

The cap down 340 is formed of a circular plate. A through-hole 341 is formed in the center of the cap down 340. The protruding portion 321 of the safety vent 320 extends through the through-hole 341. A gas discharge hole 342, through which the gas raising the protruding portion 321 of the safety vent 320 is discharged when an excessive internal pressure is generated, is formed at one side of the cap down 340.

The sub plate 350 is welded to the protruding portion 321 of the safety vent 320, which extends through the through-hole 341 of the cap down 340, thereby electrically connecting the positive electrode tab 240 to the safety vent 320.

Although not shown, a positive temperature coefficient (PTC) element may further be provided as a secondary protective device between the cap up 310 and the safety vent 320. The PTC element prevents the internal temperature from rising by interrupting the current when the secondary battery is overheated.

The cap up 310 and the safety vent 320 are seated on the protruding portion 430 provided on the inner circumferential surface of the gasket 340 installed at the upper opening of the can 100, to combine the gasket 400 with the outer circumferential surface of the cap up 310.

Referring to FIGS. 3A and 3B, the gasket 400 includes a sidewall portion 410, a bottom portion 420, a protruding portion 430, and a concave portion 440. The concave portion 440 is formed between the protruding portion 430 and an inner surface 411 of the sidewall portion 410.

The gasket 400 is compressed and fixed while it is interposed between the cap assembly 300 and the can 100. Accordingly, the gasket 400 seals a gap between the can 100 and the cap assembly 300 and insulates the can 100 and the cap assembly 300 from each other. Additionally, the gasket 400 may insulate a gap between the electrode assembly 200 and the cap assembly 300 and may absorb impacts applied from the electrode assembly 200 when the battery falls or vibrates.

A top end of the sidewall portion 410 is inwardly bent from the outside of the can 100 when a crimping operation is performed, that is, when the gasket 400 is disposed between the cap assembly 300 and the upper portion of the can 100 and compressed. In a state in which the gasket 400 is inserted into the inner circumferential surface of the upper opening of the can 100, the cap assembly 300 is seated on the protruding portion 430 and the upper portion of the can 100 is crimped. In the course of crimping the upper portion of the can 100, the sidewall portion 410 of the gasket 400 is maintained at a close contact with the cap up 310 and the outer circumferential surface of the safety vent 320 with a predetermined compressive force.

The bottom portion 420 is formed at a lower portion of the sidewall portion 410 to inwardly extend from the outside of the can 100. The bottom portion 420 serves as a barrier against an impact that may be applied from the electrode assembly 200 or center pin of a battery to the safety vent 320 when the battery falls.

The sidewall portion 410 and the bottom portion 420 may be integrally formed with each other. In addition, the sidewall portion 410 and the bottom portion 420 may be made of a material capable of absorbing shocks applied to the electrode assembly 200 or the center pin when the battery falls or vibrates. The sidewall portion 410 and the bottom portion 420 may also be made of a material capable of insulating a gap between the electrode assembly 200 and the cap assembly 300. As a non-limiting example, the sidewall portion 410 and the bottom portion 420 may be made of a material that does not react with an electrolyte. A material that is generally used in the art in the manufacture of gaskets for batteries can be used without limitation. Non-limiting examples of the useful material of the sidewall portion 410 and the bottom portion 420 may include polypropylene, polyethylene, and polyethylene terephthalate.

The protruding portion 430 protrudes from the bottom portion 420 in a direction away from the lower plate 120 of the can 100, and forms a tilt angle θ with respect to a direction parallel with the lower plate 120 of the can 100. A lower sidewall of the safety vent 320 forming the cap assembly 300 is seated on the protruding portion 430.

The concave portion 440 is formed between the protruding portion 430 and the inner surface 411 of the sidewall portion 410.

A distance A from the inner surface 411 of the sidewall portion 410 to the innermost part of the protruding portion 430 may be from 0.42 mm to 0.98 mm. If the distance A is less than 0.42 mm, a gap between the gasket 400 and the cap assembly 300 may be generated during a crimping process, making it difficult to maintain a predetermined compressive pressure. If the distance A is greater than 0.98 mm, an excessive compressive force may be applied to the gasket 400 during a crimping process. Here, the term "innermost part of the protruding portion 430" may refer to a part of the protruding portion 430 that is farthest from the inner surface 411 of the sidewall portion 410.

The protruding portion 430 may have a height B in a range from 0.3 mm to 0.6 mm. The term "height B of the protruding portion 430" may refer to a distance from the lowest point of the concave portion 440 to the highest point of the protruding portion 430. If the height B is less than 0.3 mm, a gap between the gasket 400 and the cap assembly 300 may be generated during a crimping process, making it difficult to maintain a predetermined compressive pressure. If the height B is greater than 0.6 mm, the protruding portion 430 may be positioned higher and the cap assembly 300 disposed on the protruding portion 430 may be positioned higher accordingly. Thus, an excessive compressive force may be applied to the gasket 400 during a crimping process, resulting in interference between current interrupt device (CID) components.

The tilt angle θ formed between the protruding portion 430 and the bottom portion 420 may be in a range from 25° to 75°. If the tilt angle θ is less than 25°, the gasket 400 may be insufficiently compressed, resulting in a reduction of the compressive pressure. By contrast, if the tilt angle θ is greater than 75°, the gasket 400 may be excessively deformed, which is undesirable.

Next, a secondary battery according to another embodiment will be described.

Figure 4:
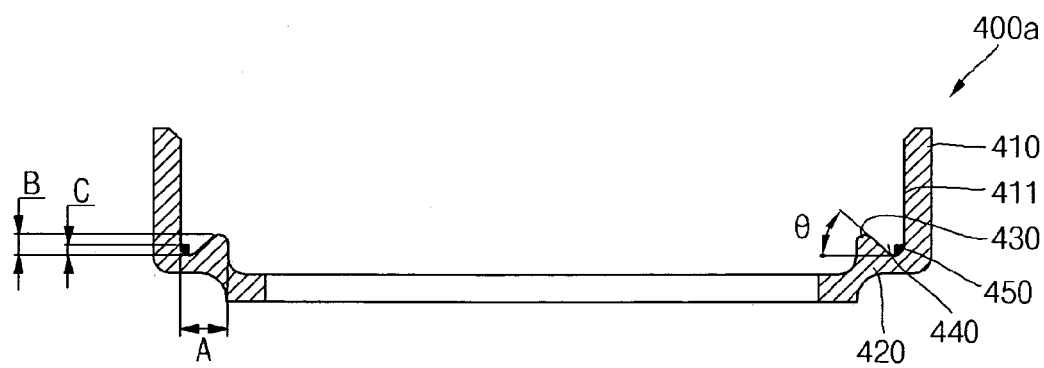
FIG. 4 illustrates a frontal section view of a gasket of a secondary battery according to another embodiment.

FIG. 4 is a frontal section view of a gasket of a secondary battery according to the illustrated embodiment.

Referring to FIG. 4, a gasket 400a of the secondary battery includes a sidewall portion 410, a bottom portion 420, a protruding portion 430, a concave portion 440 formed between the protruding portion 430 and an inner surface 411 of the sidewall portion 410, and a reinforcement member 450 formed between the protruding portion 430 and the inner surface 411 of the sidewall portion 410 and contacting the inner surface 411 of the sidewall portion 410 and the bottom surface of the concave portion 420.

The secondary battery according to the illustrated embodiment is substantially the same as that according to the previous embodiment as shown in FIGS. 1 through 3C in view of configuration and function, except that the reinforcement member 450 is further provided. Thus, explanations of common features will not be repeated, and the following description will focus on only the reinforcement member 450.

The reinforcement member 450 is formed between the protruding portion 430 and the inner surface 411 of the sidewall portion 410. Specifically, the reinforcement member 450 may be formed at a predetermined position of the bottom surface of the concave portion 440, thereby further increasing the compressive pressure. The reinforcement member 450 may be formed to contact the inner surface 411 of the sidewall portion 410 and the bottom surface of the concave portion 440. The reinforcement member 450 may reinforce a relatively weak portion, such as the position on which a force is concentrated during the crimping operation, such as a position where the concave portion 440 and the inner surface 411 of the sidewall portion 410 contact each other, thereby minimizing the gap between the gasket 400a and the cap assembly 300. The reinforcement member 450 may have various shapes. For example, the reinforcement member 450 may be formed to have a top portion having a planar shape. This is for the purpose of increasing the compressive pressure improving effect by increasing a contact area between the protruding portion 450 and the lower sidewall of the safety vent 320 during the crimping operation.

A height C of the reinforcement member 450 may be in a range of approximately ⅓ to approximately ⅔ of a height B of the protruding portion 430. If the height C of the reinforcement member 450 is greater than ⅔ of the height B of the protruding portion 430, the gasket 400a may be excessively deformed, which is undesirable. However, if the height C of the reinforcement member 450 is less than ⅓ the height B of the protruding portion 430, the effect of reinforcing the relatively weak portion may not be noticeable, so that the compressive pressure increasing effect may not be sufficient.

Next, a secondary battery according to still another embodiment will be described.

Figure 5:
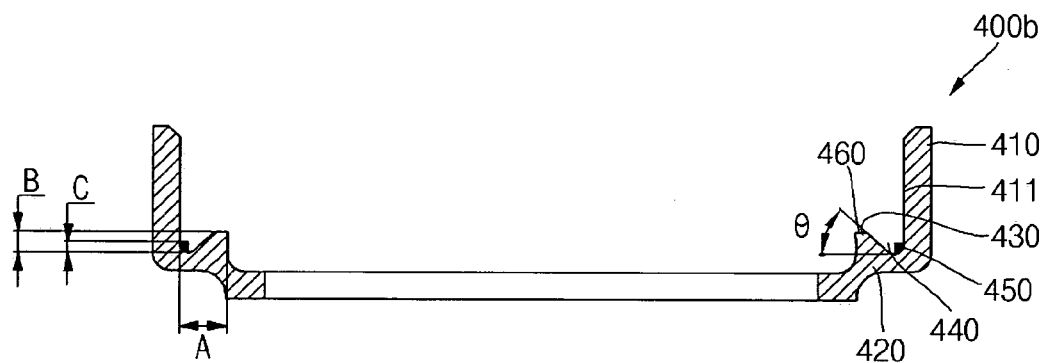
FIG. 5 illustrates a frontal section view of a gasket of a secondary battery according to still another embodiment.

FIG. 5 is a frontal section view of a gasket of a secondary battery according to still another embodiment.

Referring to FIG. 5, a gasket 400b of the secondary battery according to the illustrated embodiment includes a sidewall portion 410, a bottom portion 420, a protruding portion 430 having a planar portion 460 formed on top of the same, a concave portion 440 formed between the protruding portion 430 and an inner surface of the sidewall portion 410, and a reinforcement member 450 positioned between the protruding portion 430 and the inner surface of the sidewall portion 410.

The secondary battery according to the illustrated embodiment is substantially the same as that according to the previous embodiment as shown in FIG. 4 in view of configuration and function, except that the planar portion 460 is formed on top of the protruding portion 430. Thus, explanations of common will not be repeated and the following description will focus on only the planar portion 460.

As stated above, the planar portion 460 is formed on top of the protruding portion 430.

The planar portion 460 effectively increases the compressive pressure by sufficiently compressing the bottom surface of the safety vent 320 and the protruding portion 430 by increasing the contact area therebetween. The planar portion 460 may have a length in a range from 0.1 mm to 0.25 mm. Herein, the term "length" with respect to the planar portion 460 may refer to a distance in a radial direction of the planar portion 460. If the length of the planar portion 460 is less than 0.1 mm, the contact area between the protruding portion 460 and the bottom surface of the safety vent 320 may be too narrow to obtain the compressive pressure increasing effect. However, if the length of the planar portion 460 is greater than 0.25 mm, the gasket 400b may be excessively deformed.

By way of summation and review, embodiments described herein provide a secondary battery in which a reduction in a compressive force between a cap assembly and a can or in which a gap that may be generated therebetween during a crimping operation may be prevented even when a gasket and the cap assembly are insufficiently compressed. In a secondary battery, the electrode assembly is received in the cylindrical can, and then a beading part is formed on an upper portion of the can, to prevent the electrode assembly from moving in the can. In addition, a gasket is provided inside the upper opening of the can, to secure various battery components, and to seal the can. The cap assembly is disposed inside the gasket, to finish the upper opening of the can. Then, the can is crimped at the upper opening, to combine a cap up of the cap assembly with the gasket.

According to the embodiments, the protruding portion formed in the gasket and the reinforcement member can prevent a reduction in sealability between the cap assembly and the can when a gasket and the cap assembly are insufficiently compressed or when a gap is generated therebetween during a crimping operation. The secondary battery can maintain sealability between the can and the cap assembly by minimizing a gap generated between the cap assembly and a gasket during crimping of the can using a concave portion formed between a protruding part and an inner surface of the gasket.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
    an electrode assembly formed by stacking two different electrodes and a separator interposed therebetween and winding the same;
    a can to house the electrode assembly;
    a cap assembly at a upper opening of the can; and
    a gasket interposed between the cap assembly and the can, the gasket having a relaxed condition prior to compression between the cap assembly and an upper portion of the can and a compressed condition after compression between the cap assembly and the upper portion of the can;
    wherein the gasket includes:
        a sidewall portion bent inwardly from outside of the can when the gasket is in the compressed condition,
        a bottom portion at a bottom of the sidewall portion and extending inwardly from a periphery of the can,
        a protruding portion on which the cap assembly is seated, and
        a concave portion formed between the protruding portion and an inner surface of the sidewall portion; and
    a reinforcement member between the inner surface of the sidewall portion and the protruding portion of the gasket.

2. The secondary battery as claimed in claim 1, wherein, when the gasket is in the relaxed condition, the protruding portion protrudes from the bottom portion in a direction away from a lower plate of the can and forms a tilt angle with respect to a direction parallel with the lower plate of the can.

3. The secondary battery as claimed in claim 2, wherein the tilt angle is in a range from 25° to 75°.

4. The secondary battery as claimed in claim 2, wherein a top of the protruding portion includes a planar portion.

5. The secondary battery as claimed in claim 4, wherein the planar portion has a length in a radial direction in a range from 0.1 mm to 0.25 mm.

6. The secondary battery as claimed in claim 1, wherein the cap assembly includes a cap up, a safety vent, and a cap down.

7. The secondary battery as claimed in claim 6, wherein a positive temperature coefficient (PTC) element as a secondary protective device is further provided between the cap up and the safety vent.

8. The secondary battery as claimed in claim 1, wherein, when the gasket is in the relaxed condition, a distance between the inner surface of the sidewall portion and the innermost part of the protruding portion is in a range from 0.42 mm to 0.98 mm.

9. The secondary battery as claimed in claim 1, wherein, when the gasket is in the relaxed condition, the protruding portion has a height in a range from 0.3 mm to 0.6 mm.

10. The secondary battery as claimed in claim 1, wherein the reinforcement member contacts the inner surface of the sidewall portion and the bottom surface of the concave portion.

11. The secondary battery as claimed in claim 1, wherein the reinforcement member has a top portion having a planar shape.

12. The secondary battery as claimed in claim 1, wherein, when the gasket is in the relaxed position, a height of the reinforcement member is in a range of $1/3$ to $2/3$ of a height of the protruding portion.

13. The secondary battery as claimed in claim 1, wherein the gasket is made of at least one of polypropylene, polyethylene, and polyethylene terephthalate.

14. The secondary battery as claimed in claim 1, wherein the can that houses the electrode assembly is cylindrical.

* * * * *